(12) United States Patent
Wright

(10) Patent No.: US 11,739,857 B2
(45) Date of Patent: Aug. 29, 2023

(54) HYDRAULIC LOW-TORQUE VALVE CONVERSION APPARATUS AND METHOD

(71) Applicant: David C. Wright, Magnolia, TX (US)

(72) Inventor: David C. Wright, Magnolia, TX (US)

(73) Assignee: WRIGHT'S IP HOLDINGS, LLC, Magnolia, TX (US)

( * ) Notice: Subject to any disclaimer, the term of this patent is extended or adjusted under 35 U.S.C. 154(b) by 0 days.

(21) Appl. No.: 17/768,064

(22) PCT Filed: Oct. 13, 2020

(86) PCT No.: PCT/US2020/055395
§ 371 (c)(1),
(2) Date: Apr. 11, 2022

(87) PCT Pub. No.: WO2021/072402
PCT Pub. Date: Apr. 15, 2021

(65) Prior Publication Data
US 2022/0364657 A1      Nov. 17, 2022

Related U.S. Application Data

(60) Provisional application No. 62/913,955, filed on Oct. 11, 2019.

(51) Int. Cl.
*F16K 31/163*      (2006.01)
*F16K 5/04*      (2006.01)
*F16K 31/52*      (2006.01)

(52) U.S. Cl.
CPC ........ *F16K 31/1635* (2013.01); *F16K 5/0442* (2013.01); *F16K 31/522* (2013.01)

(58) Field of Classification Search
CPC .. F16K 31/522; F16K 31/1635; F16K 5/0442; F16K 31/44–62; F16K 31/12–62; F16K 31/528; F16K 31/5282; F16K 31/5284; Y10T 137/6031; Y10T 137/6035; Y10T 137/614; Y10T 137/87386; Y10T 137/87442; Y10T 137/87523; Y10T 137/88102; Y10T 137/86533; Y10T 137/86566; Y10T 137/86638;
(Continued)

(56) References Cited

U.S. PATENT DOCUMENTS 3,104,592 A * 9/1963 Sheesley ............... F15B 15/066
92/140
3,146,681 A * 9/1964 Sheesley ............... F15B 15/066
92/138
(Continued)

*Primary Examiner* — Craig J Price
(74) *Attorney, Agent, or Firm* — McCutcheon Joseph, PLLC

(57) ABSTRACT

A conversion kit creates a redundant hydraulic, pneumatic, or mechanical control functionality for low-torque, quarter-turn plug valves in remote production environments (i.e., rural or subsea pipelines). The conversion kit comprises at least one custom end cap fitted to the valve and comprising a socket receiving a rotator attachment. Each rotator attachment is in turn connected to a crossover which connects to a bracket remotely actuated via hydraulic, pneumatic, or mechanical control. The linear movement of the bracket and the attached crossover[s] is converted to rotational force which is transmitted through the rotator attachments to the at least one valve.

9 Claims, 4 Drawing Sheets

(58) Field of Classification Search
CPC ..... Y10T 137/86646; Y10T 137/86743; Y10T 137/86751; Y10T 137/86823; Y10T 137/86863; Y10T 137/86871; Y10T 137/87129
USPC ........... 137/614.11, 613; 74/20–110; 251/62, 251/231–233, 279, 280
See application file for complete search history.

(56) References Cited

U.S. PATENT DOCUMENTS

| | | | | |
|---|---|---|---|---|
| 3,410,422 | A * | 11/1968 | Carpentier | F16K 1/2007 414/221 |
| 3,610,568 | A * | 10/1971 | Duwe | F16K 31/1635 251/58 |
| 4,133,215 | A | 1/1979 | Norris et al. | |
| 4,647,003 | A * | 3/1987 | Hilpert | F16K 31/1635 137/554 |
| 4,817,663 | A * | 4/1989 | McAndrew | F16K 5/0647 251/293 |
| 5,240,030 | A * | 8/1993 | Wang | F16K 31/055 137/269 |
| 5,542,643 | A * | 8/1996 | Breth | F16K 31/1635 251/279 |
| 5,564,461 | A * | 10/1996 | Raymond, Jr. | F16K 1/221 403/337 |
| 6,508,272 | B1 | 1/2003 | Parsons et al. | |
| RE41,229 | E * | 4/2010 | Swinford | F16K 1/221 60/785 |
| 8,128,057 | B2 * | 3/2012 | Swinford | F01D 9/06 251/305 |
| 8,863,596 | B2 * | 10/2014 | Holtgraver | F16K 31/1635 74/49 |
| 9,896,993 | B2 * | 2/2018 | Dilalan | F16K 31/1635 |
| 10,323,765 | B2 * | 6/2019 | Scaramucci | F16K 31/055 |
| 2004/0099833 | A1 | 5/2004 | Haikawa et al. | |
| 2015/0000127 | A1 * | 1/2015 | Werstat | F01D 17/105 29/888 |
| 2016/0348802 | A1 | 12/2016 | Halimi et al. | |
| 2017/0350525 | A1 | 12/2017 | Scaramucci et al. | |

* cited by examiner

HYDRAULIC LOW-TORQUE VALVE CONVERSION APPARATUS AND METHOD

REFERENCE TO RELATED APPLICATIONS

The present application is a U.S. national stage application claiming priority to PCT application WO 2021/072402, filed 13 Oct. 2020 and entitled "Hydraulic Low-Torque Valve Conversion Apparatus and Method," which in turn claimed priority to U.S. Provisional Application No. 62/913,955, filed 11 Oct. 2019 and entitled "Hydraulic Low-Torque Valve Conversion Apparatus and Method." The entire contents of the above-referenced applications are incorporated herein by reference.

FIELD OF THE APPLICATION

The application relates generally to a method and conversion apparatus usable for converting manually operated low-torque plug valves to hydraulic operation, enabling remote actuation while retaining the original manual operability.

BACKGROUND

In oil & gas production, the use of low-torque, manually operated quarter-turn plug valves is common in pipelines transporting produced hydrocarbons. However, these pipelines are often located in remote areas, including subsea environments, where manual access (or access via ROV) can be difficult.

In addition, more stringent regulations on pipeline safety make it desirable to add a redundant control system, such as mechanical, hydraulic, or electronic control. Since it can be inconvenient to wholly replace these valves, it is especially desirable that such a redundant control system be capable of retrofitting onto existing manual valves.

Prior art retrofit systems, such as U.S. Pat. No. 6,142,171 to Hancock and U.S. Pat. No. 8,256,742 to Staffiere, have utilized self-contained motors to retrofit individual valves with electronic actuator mechanisms which can be operated remotely. However, because these valves are often found in series, it can be useful to actuate more than one valve utilizing the same mechanism.

A need therefore exists for a system which retrofits low-torque valves with an electromechanical hydraulic control system, the system being capable of actuating multiple valves with the same stroke. Embodiments disclosed in the present application meet this need.

SUMMARY

The invention relates generally to a conversion kit for transmitting a rotational force to at least one quarter turn valve in a pipeline, the kit comprising at least one actuating cap, wherein each respective actuating cap is connected to a respective quarter turn valve, and wherein the respective actuating cap comprises a socket facing outward and away from the respective quarter turn valve, at least one rotator attachment, wherein each respective rotator attachment comprises an first section fit to the respective socket of the respective actuating cap and a second section extending outward therefrom, and at least one crossover, wherein each respective crossover comprises a primary orifice receiving a respective rotator attachment second section and a seat attached to an actuating bracket, wherein the actuating bracket receives a linear force and moves the at least one crossover, wherein the at least one crossover transmits the linear force into a rotational force on the at least one actuating cap through the respective at least one rotator attachment, and wherein the rotational force of the at least one actuating cap actuates the at least one quarter turn valve.

DRAWINGS

DESCRIPTION OF THE INVENTION

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, order of operation, means of operation, equipment structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views as desired for easier and quicker understanding or explanation. As well, the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings, and that the components may be oriented differently, for instance, during transportation and manufacturing as well as operation. Because many varying and different embodiments may be made within the scope of the concepts herein taught, and because many modifications may be made in the embodiments described herein, it is to be understood that the details herein are to be interpreted as illustrative and non-limiting.

Embodiments of the present invention include an apparatus and system for retrofitting low-torque valves for remote control, comprising a valve conversion kit. The kit, when installed, allows for both manual actuation of the valves as well as hydraulically driven mechanical actuation of the valves, and which can fully actuate multiple valves with a single stroke movement. As shown in the Figures, the valve conversion kit comprises at least one custom actuating cap which replaces the standard circular caps commonly fit to these valves.

Figure 1:
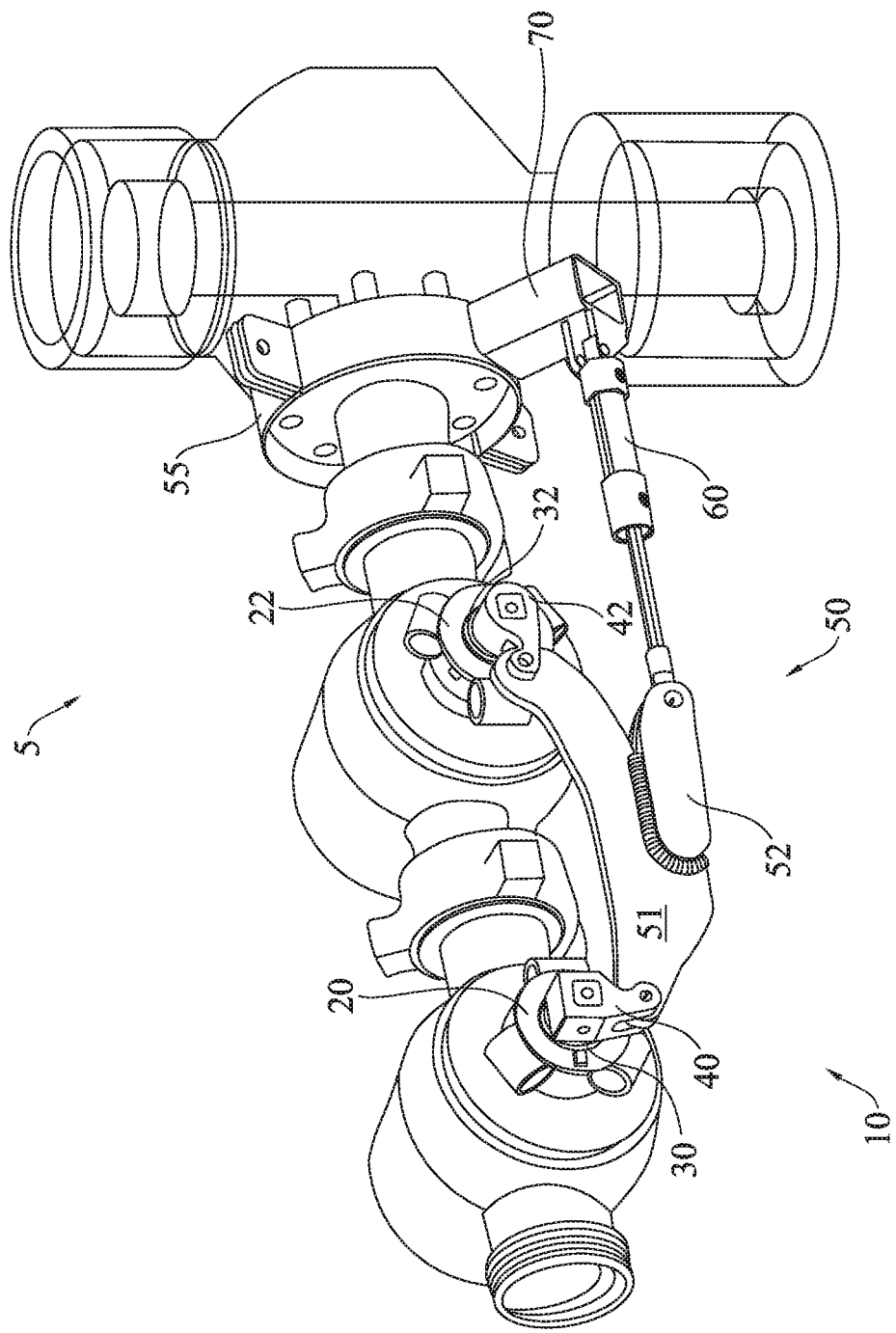
FIG. 1 depicts a perspective view of a series of two low-torque valves with an embodiment of the invention installed.

Turning now to FIG. 1, the Figure depicts an external perspective view of an embodiment of a valve system 5 comprising two manually operated low-torque, high-pressure valve mechanisms 7 (visible in FIG. 2) in series. In the depicted embodiment, the conversion kit 10 comprises two custom actuating caps 20 and 22, which replace the standard circular actuating caps commonly fit to these valves. A shown, the actuating caps 20 and 22 can be mechanically connected to valve crossovers 40 and 42, respectively. This can be done via rotator attachments 30 and 32, respectively, which are seated within the actuating caps 20, 22, as shown.

Conversion kit 10 further comprises crossovers 40, 42, which are in turn shown attached to a connector 50. Connector 50 comprises a metal bracket 51, which can be seated within a groove formed by connector seat 52. The embodiment depicted shows bracket 51 welded to connector seat 52; in alternative embodiments the connector 50 may be formed from a single piece. Connector seat 52 can in turn be attached to a hydraulic cylinder 60. Hydraulic cylinder 60 can be attached at the other end to a clamp 55 via a bracket extension 70. In use, the hydraulic cylinder 60, when actuated, can extend to push the connector 50, which can rotate the valve crossovers 40 and 42 via their attachment to metal bracket 51.

Figure 2:
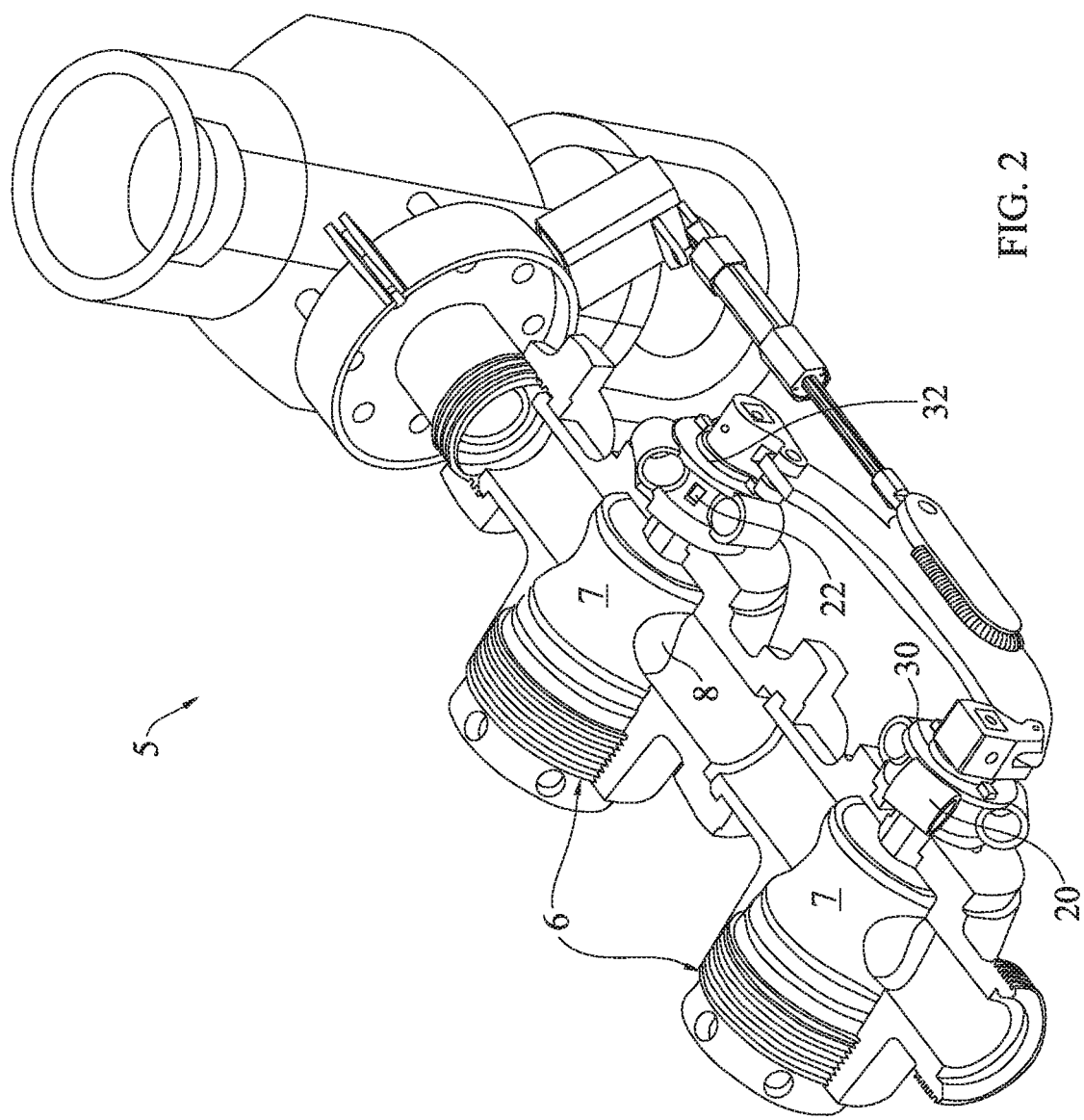
FIG. 2 depicts a cutaway view of the two low-torque valves of FIG. 1 with an embodiment of the invention installed.

Turning now to FIG. 2, a view of an embodiment of the valve system 5 is shown in cross section. Valve system 5 can comprise valves with standard threads 6, and an internal valve mechanism 7, which may be a ball valve, butterfly valve, gate valve, or any other valve suited for quarter-turn operations which create and shut off a flow path 8, which is internal to the pipeline and based on the position of the valve mechanism 7. The actuating caps 20, 22 and the rotator attachments 30, 32 can be used to directly transmit the rotational force to the internal valve mechanism 7.

Figure 3:
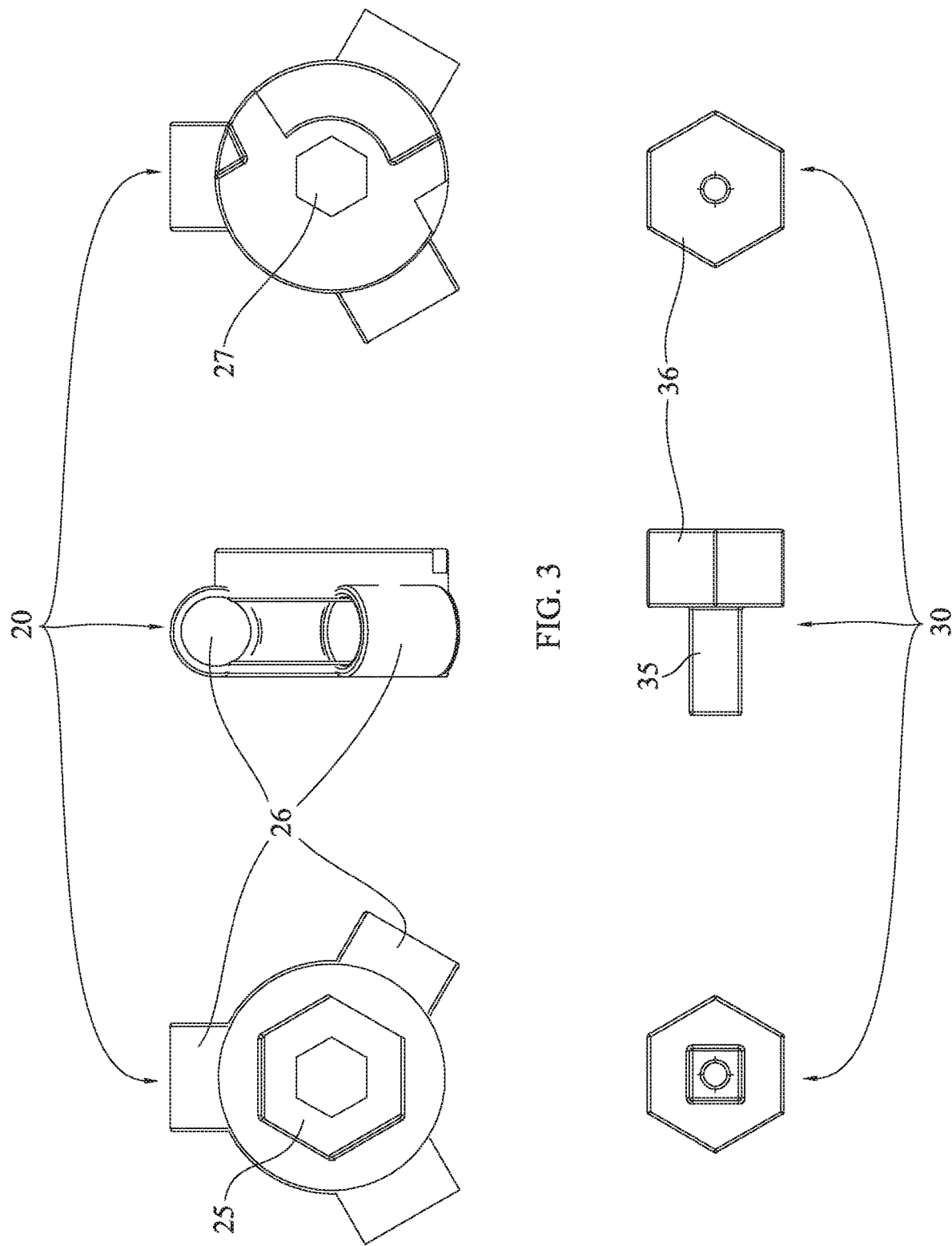
FIG. 3 depicts a close-up view of an embodiment of the attachment caps and rotators.

Turning now to FIG. 3, an actuating cap 20 and rotator attachment 30 are shown in greater detail. As shown, actuating cap 20 can have a hexagonal design 25, which is fitted to seat a corresponding first section 36 of the rotator attachment 30, while a second section 35 of rotator attachment 30 can extend out into crossover 40. Actuating cap 20 can also retain the usual hand tool attachment points 26 as well as an underbody profile 27, which can determine the quarter-turn range of motion of the actuating cap.

Figure 4A:
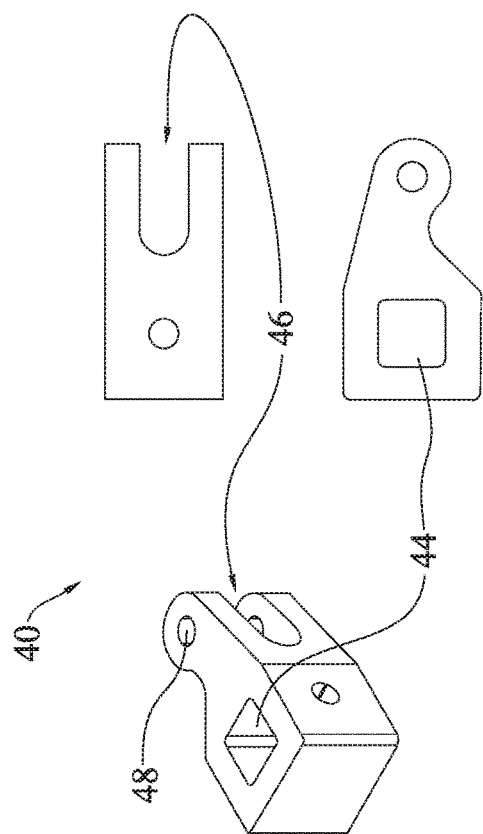
FIGS. 4A and 4B depict perspective, side, and top views of two embodiments of valve crossovers.
Figure 4B:
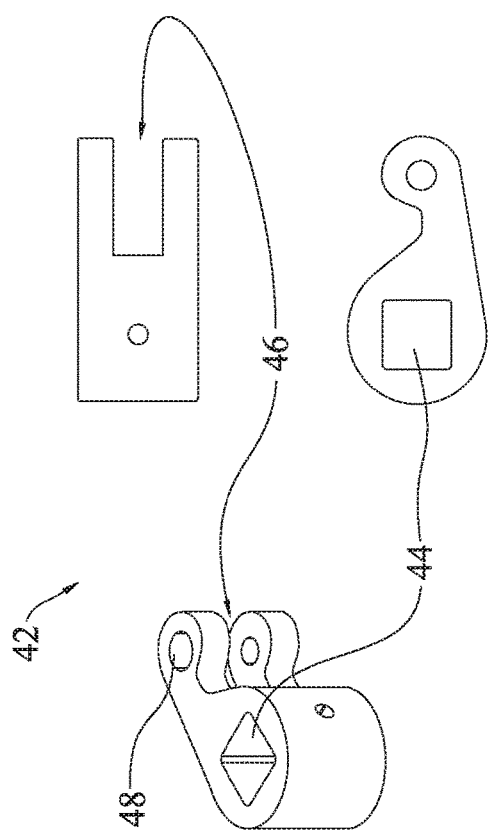

Turning now to FIGS. 4A and 4B, two embodiments of a valve crossover 40 and 42 are shown in more detail. As shown, both valve crossovers comprise a rectangular primary orifice 44 matching the rectangular second section 35 of rotator attachments 30, 32, and two protrusions extending from either side of the crossover 40 in parallel, the space between the two protrusions defining a connecting groove 46. Each protrusion further comprises a connecting orifice 48 positioned therethrough.

In use, rectangular primary orifice 44 can receive the rectangular second section 35 of rotator attachment 30 (depicted in FIG. 3), while the connecting groove 46 can receive a section of the metal bracket 51 of connector 50 (depicted in FIGS. 1-2). Metal bracket 51 may be affixed through the connecting orifices 48 by a through bolt, locking tabs, or any other suitable attachment mechanism known in the art. Valve crossover 40 is shown with a square external profile while valve crossover 42 comprises a rounded external profile.

Advantageously, the valve conversion kit described herein can be used to convert manual valves for use in subsea applications to provide an alternative to manual actuation which would require a diver or ROV to physically access the valves. By running a jumper line to the cylinder 60, a surface operator can actuate single or dual-valve setups using a purely mechanical, hydraulic, and/or pneumatic force, while still leaving the valves suitable for manual operation should it be necessary or preferable under the circumstances.

It can be appreciated that, while the depicted embodiment is shown with two valves in series, the invention may be adapted in various ways, e.g., a bracket 51 may attach to one or three crossovers and one or three actuating caps to actuate one or three respective valves in a similar fashion, or a perpendicular bracket may actuate valves in parallel rather than series. In addition, the hexagonal connection of the actuating caps 20, 22 and rotator attachments 30, 32, or the rectangular connections of the rotator attachments 30, 32 and crossovers 40, 42 may comprise alternative shapes.

Various embodiments, usable within the scope of the present disclosure, have been described with emphasis and these embodiments can be practiced separately or in various combinations thereof. In addition, it should be understood that within the scope of the appended claims, the present invention can be practiced other than as specifically described herein.

The invention claimed is:

1. A conversion kit for transmitting a rotational force to at least one quarter turn valve in a pipeline, the kit comprising:
   at least one actuating cap, wherein each respective actuating cap is connected to a respective quarter turn valve, and wherein the respective actuating cap comprises a socket facing outward and away from the respective quarter turn valve;
   at least one rotator attachment, wherein each respective rotator attachment comprises a first section fit to the respective socket of the respective actuating cap and a second section extending outward therefrom; and
   at least one crossover, wherein each respective crossover comprises a primary orifice receiving a respective rotator attachment second section and a groove seating an actuating bracket,
   wherein the actuating bracket receives a linear force and moves the at least one crossover, wherein the at least one crossover transmits the linear force into a rotational force on the at least one actuating cap through the respective at least one rotator attachment, and wherein the rotational force of the at least one actuating cap actuates the at least one quarter turn valve.

2. The conversion kit of claim 1, wherein the groove of the at least one crossover comprises a space between a pair of parallel protrusions with a pair of connecting orifices extending through the pair of parallel protrusions, and wherein the actuating bracket extends into the groove between the pair of connecting orifices and attaches through the pair of connecting orifices.

3. The conversion kit of claim 1, wherein the socket of the at least one actuating cap is hexagonal, and wherein a corresponding first portion of the at least one rotator attachment is hexagonal.

4. The conversion kit of claim 1, wherein a second portion of the at least one rotator attachment is rectangular, and wherein the corresponding primary orifice of the at least one crossover is rectangular.

5. The conversion kit of claim 1, wherein the at least one actuating cap further comprises a quarter-turn profile facing inward towards the respective at least one quarter turn valve, and wherein the quarter-turn profile delimits a range of motion for the at least one actuating cap.

6. The conversion kit of claim 1, wherein the at least one crossover comprises a square external profile.

7. The conversion kit of claim 1, wherein the at least one crossover comprises a rounded external profile.

8. The conversion kit of claim 1, wherein the actuating bracket receives the linear force from an actuating cylinder, wherein the actuating cylinder receives a remotely controlled hydraulic, pneumatic, or mechanical force.

9. The conversion kit of claim 1, further comprising a bracket extension connected to the actuating cylinder, wherein the bracket extension is connected to a clamp surrounding the pipeline.

* * * * *